United States Patent
Giesen et al.

(10) Patent No.: US 7,896,237 B2
(45) Date of Patent: Mar. 1, 2011

(54) CREDIT CARD OFFER AND ACTIVATION SYSTEM AND METHOD

(75) Inventors: Jay Giesen, Centennial, CO (US);
Richard Elliott Greer, Greenville, SC (US)

(73) Assignee: Compucredit Intellectual Property Holdings Corp. II, Las Vegas, NV (US)

( * ) Notice: Subject to any disclaimer, the term of this patent is extended or adjusted under 35 U.S.C. 154(b) by 1225 days.

(21) Appl. No.: 11/466,708

(22) Filed: Aug. 23, 2006

(65) Prior Publication Data
US 2007/0045406 A1    Mar. 1, 2007

Related U.S. Application Data

(60) Provisional application No. 60/710,640, filed on Aug. 23, 2005.

(51) Int. Cl.
*G06K 5/00* (2006.01)
*G07D 11/00* (2006.01)
(52) U.S. Cl. .......................... 235/380; 235/379
(58) Field of Classification Search .................. 235/379, 235/380; 705/35, 38, 42, 44
See application file for complete search history.

(56) References Cited

U.S. PATENT DOCUMENTS

| | | | | |
|---|---|---|---|---|
| 6,144,948 | A * | 11/2000 | Walker et al. | 705/38 |
| 6,324,524 | B1 * | 11/2001 | Lent et al. | 705/38 |
| 6,877,656 | B1 | 4/2005 | Jaros et al. | |
| 7,131,583 | B2 * | 11/2006 | Jaros et al. | 235/380 |
| 2003/0078877 | A1 * | 4/2003 | Beirne et al. | 705/38 |
| 2005/0288941 | A1 * | 12/2005 | DuBois et al. | 705/1 |

* cited by examiner

*Primary Examiner* — Thien M Le
(74) *Attorney, Agent, or Firm* — Philip H. Burrus, IV; Chason A. Carroll

(57) ABSTRACT

A method and system for providing and activating a credit card and credit line to a consumer. In one embodiment, the system and method include providing the consumer with a choice of one credit card from a plurality of cards. In response to the consumer's selection of one of the plurality of credit cards, an immediate authorization request is made for the credit card from an authorization source, such as a mobile telephone, kiosk, cash register, or credit card transaction device. Upon transmission of the authorization request, a rapid approval or disapproval is made based upon the applicant's financial status. This status may include the existence of an open bank account, such as a checking or savings account, or other credit worthiness indicia, such as prior business history with the lender and prior credit history. Once activated, the credit card may be used to purchase goods and services.

26 Claims, 7 Drawing Sheets

CREDIT CARD OFFER AND ACTIVATION SYSTEM AND METHOD

CROSS REFERENCE TO PRIOR APPLICATIONS

This application claims priority and benefit under 35 U.S.C. §119(e) from U.S. Provisional Application No. 60/710,640, filed Aug. 23, 2005, which is incorporated by reference for all purposes.

BACKGROUND

1. Technical Field

This invention relates generally to a system for allowing a consumer contemporaneously obtain and activate a credit card, and more specifically to a method and system permitting a consumer to physically obtain a credit card, perhaps at a point of sale, and to have the credit card activated within a relatively short time thereafter.

2. Background Art

Credit cards provide consumers and businesses with a means to purchase goods and services at a first date, while paying for these goods and services at a later date. Credit cards are advantageous in that they help people manage cash flow. For instance, a consumer may purchase food when convenient, while paying for that food at a later time, perhaps after receiving a paycheck. Similarly, businesses may make purchases of raw materials with a credit card, thereby delaying payment until those materials may be converted into product and sold.

Ordinarily, consumers and businesses obtain credit cards through the mail. The application may be in response to a solicitation, or it may be a direct application made by an applicant, either on paper or on-line, perhaps through the Internet. Upon applying for the credit card, a lender then researches the applicant's financial history. This may include pulling credit reports, checking with employers, and checking bank and financial account records. Once approved, the lender issues and mails a credit card to the applicant. Once the card is received, the applicant must then activate the card, usually by calling a number and providing information to validate both the applicant's identity and his receipt of the card.

The problem with these prior art approval-disbursement-activation systems is that they are time consuming. The application and approval process can take several weeks. Where a person needs credit quickly, the prior art methods simply do not suffice. By way of example, when an emergency strikes, such as a thunderstorm damaging the roof of a home, a person may need credit quickly to properly patch the roof. Prior art systems requiring a delay of weeks are not effective options.

A second problem with prior art systems is that they provide the applicant with very little choice. Unless the Applicant receives several solicitations in the mail at the same time, it may be difficult and cumbersome to compare the various terms and conditions associated with each card.

There is thus a need for an improved credit card offer, approval, and activation system that reduces the overall time between consumer demand and activation, which additionally facilitates consumer choice.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
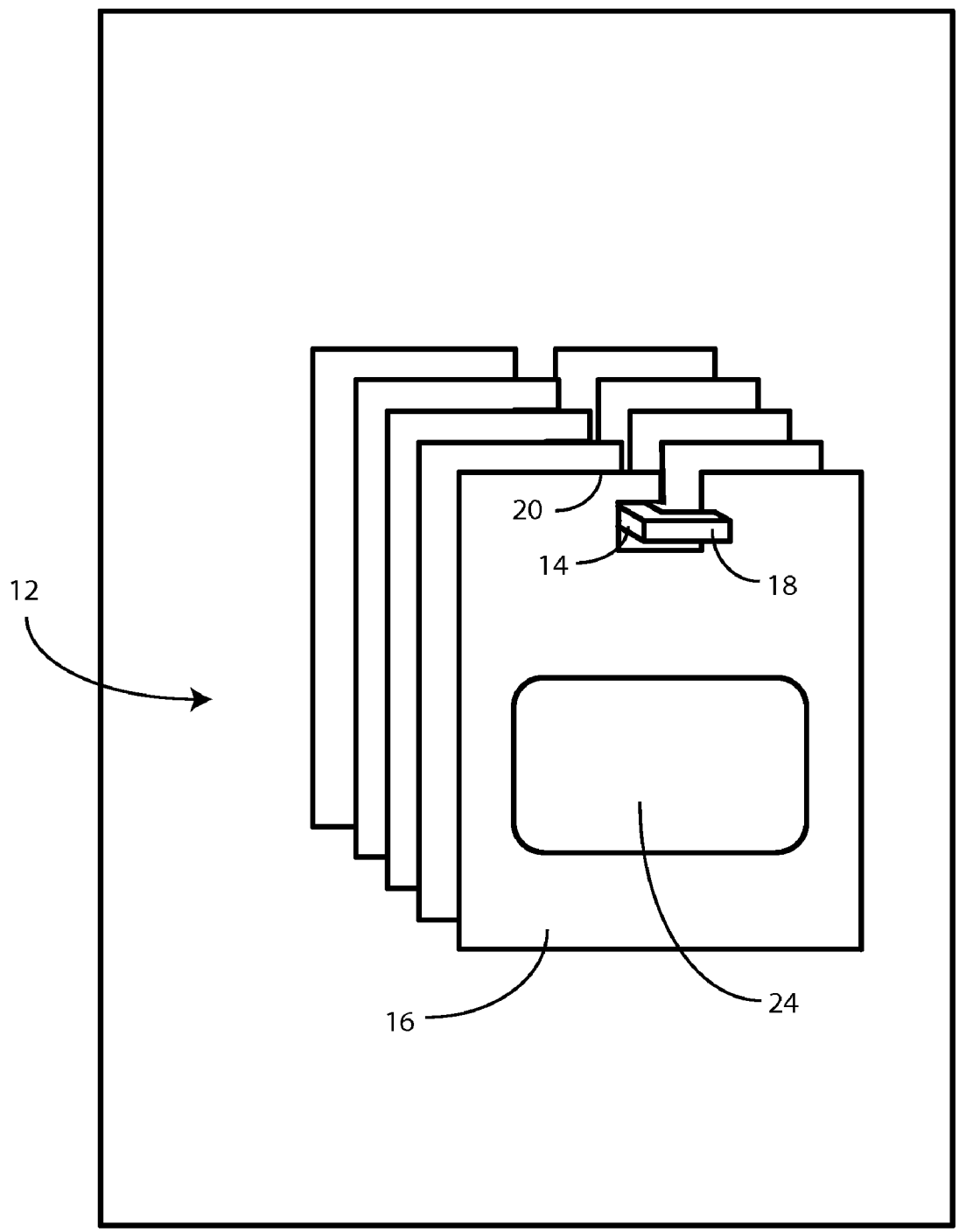
FIG. 1 illustrates a perspective view of a credit card display having a plurality of credit cards in accordance with one embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to provide a simple, on-site means for providing, authorizing, and authenticating credit cards. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of issuing and activating credit cards as described herein. The systems and non-processor circuits may include, but are not limited to, file servers, databases, networked communication devices, network infrastructure, such as the Internet and World Wide Web, transmitters, signal drivers, clock circuits, power source circuits, and user input devices. Functions of apparatus components may be interpreted as steps of a method to perform the issuance and activation of credit cards. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such systems and programs with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Generally, embodiments of the invention include a system and method for providing and activating credit card and credit line to a consumer. As used herein, "consumer" may refer to any person or entity making purchases, including individuals and agents of businesses. In one embodiment, the system and method include providing the consumer with a choice, as one or more credit cards and types of credit cards are available for selection by the consumer. In response to the consumer's selection of one of the plurality of credit cards, an immediate authorization request is made for the credit card from an authorization source, such as a mobile telephone, kiosk, cash register, or credit card transaction device. Upon transmission of the authorization request, a rapid approval or disapproval is made based upon the applicant's financial status. This status may include the existence of an open bank account, such as a checking or savings account, or other credit worthiness indicia, such as prior business history with the lender and prior credit history.

In one embodiment, the present invention includes the consumer selecting a credit card and taking the credit card to a validation site, such as, but not limited to, a checkout station, kiosk, cash register, customer service desk, computer terminal, self-checkout stand, or other equivalent. This validation site may be a merchant point of sale, perhaps at the moment when the consumer desires to purchase one or more goods or services.

In one embodiment, a validation process includes the consumer providing evidence at the validation site of financial account status. For instance, the consumer may provide evidence of an existing bank account, such as a checking account. One method for doing so is to present a blank check. Data can be extracted from information provided about the account. By way of example, an account number may be used to confirm the account as open and in good standing. Additional information, such as the consumer's name, address, phone number, social security number, and the like, may also be obtained from the check or equivalent information for populating a database for use in establishing a credit card account for the consumer.

In addition to validation by way checking account status, regulatory databases may be simultaneously or contemporaneously checked to ensure compliance with regulatory requirements, including the Patriot Act, requirements of the Office of Foreign Asset Control (OFAC), federal, state, and local laws and regulations, etc. Upon making a credit-worthiness determination based, in whole or in part, on the foregoing data and information, and an evaluation of the consumer's bank account, the consumer's bank account may be scored using a credit card issuer's credit risk/credit-worthiness scoring method to yield an account score. Based on a favorable account score, a credit card account can be established, and the consumer assigned a line of credit. The consumer can agree at this point to the terms and conditions of the credit card account, for example, by signing a document incorporating such terms and conditions, and/or by entering personal information, a personal identification number (PIN), and/or a unique biometric indicator such as a voice recognition, fingerprint, retina scan, hand vein pattern, etc. Upon acceptance by the consumer of the terms and conditions, the credit card is activated and is ready for use by the consumer.

In one embodiment, the present invention also includes, in another embodiment, a method that includes the consumer selecting a credit card before seeking approval. For instance, a consumer may select one from several credit cards presented at a display at the merchant location. Where the credit card display includes the various terms and conditions associated with each card, the consumer may easily and efficiently compare terms to determine which card is best. Additionally, the enhanced selection may offer the consumer a choice based upon other factors. In one example, the consumer may be able to choose between cards associated with various sports teams or colleges, perhaps to identify himself as a fan.

In one embodiment, in addition to or instead of taking the card to a validation site, such as the checkout station, the consumer is given a telephone number that connects the consumer directly to a validation site. For instance, while shopping, the consumer may determine that he wishes to purchase more than his available funds will accommodate. Thus, he may want to apply for the card while shopping, thus being able upon activation to determine how many items may be purchases. By using the telephonic embodiment, the consumer may obtain access to a validation site that includes live personnel, voice prompts, computer generated voice recognition technology, etc., for receiving data necessary from the consumer and for performing the validation process, such as discussed above, to establish the consumer's credit-worthiness. The consumer could provide such information through use of a telephone keypad, a computer, by voice, etc.

In another embodiment of the invention, the consumer selects the Internet, or an intranet or other computer network, to go to a server through a validation website, or via email, where the consumer could input the data necessary for a credit card account issuer, or some other party, to perform the verification process.

Turning now to FIG. 1, illustrated therein is a plurality of credit card packs 12 situated for display, and hanging on a conventional display hook 14 commonly found in stores and retail outlets. Credit card packs 12 include a support package 16 having a profiled opening 18 in the top edge 20 thereof, known as a "J-hook" cutout or opening 18, and credit card packs 12 are supported on hook 14 using J-hook opening 18.

An inactivated credit card 24 is attached to the package 16 of each credit card pack 12, and the credit card packs 12 are, in one embodiment, made available as general merchandise-type items in ordinary retail facilities. As used herein, "inactive" refers to an authentic credit card, with a number associated therewith, which has not yet been given a credit limit or been associated with a client. The credit cards are real cards, however, in that they have been issued by lenders and have been established in corresponding lender databases and systems.

The availability of credit cards, which may be selected by consumers prior to activation, is one feature associated with the present invention that offers advantages over the prior art. For instance, U.S. Pat. No. 6,877,656, issued to Jaros et al. on Apr. 12, 2005, entitled, "Systems, methods, and apparatus for instant issuance of a credit card" teaches a system where an applicant first applies and is approved for a credit card. Only after approval is the credit card created and dispensed by an embosser. By contrast, in embodiments of the present invention, a consumer is able to select and receive an actual credit card prior to approval and activation. This presentation of the card prior to activation reduces overall processing time and cost.

Credit cards 24 could be offered by typical credit card issuers, such as MASTERCARD®, VISA®, DISCOVER®, AMERICAN EXPRESS®, or the like. Further, multiple hooks and cards may be offered, with each of the cards representing different terms, conditions, benefits, or affiliations, thereby offering the consumer a choice in available cards. Should a consumer wish to obtain a credit card 24 and have it activated, the consumer would simply remove a credit card pack 12 from the hook, and take it into his or her possession. From this point, the card can be activated in various ways.

It will be clear to those of ordinary skill in the art having the benefit of this disclosure that the credit cards 24 could be displayed, dispensed, or otherwise physically provided to the consumer in manners other than credit card packs 12, and that the present invention is not to be construed or limited to the credit card delivery manner depicted in the drawings and disclosed herein. Although not shown in the drawings, a machine could be used to dispense credit cards 24, or credit cards 24 could be provided by mail, or through a walk-up, or drive-thru window.

In one embodiment of the invention, the consumer, after having performed the step of selecting a credit card 24, proceeds to a validation site or station, which could be onsite with the retailer, and which could be a typical merchandise checkout stand. Alternately, the validation site or station could be a stand-alone terminal, kiosk, customer service desk, or other equivalent. At the validation site, the credit card 24 selected by the consumer may be swiped through an electrical reader to obtain corresponding credit card information. For instance, the swipe may yield the credit card number, bank affiliation, or other identifier. Further, the information, including credit card number may be entered in some other manner, such as by keying the number in using a keypad.

Figure 5:
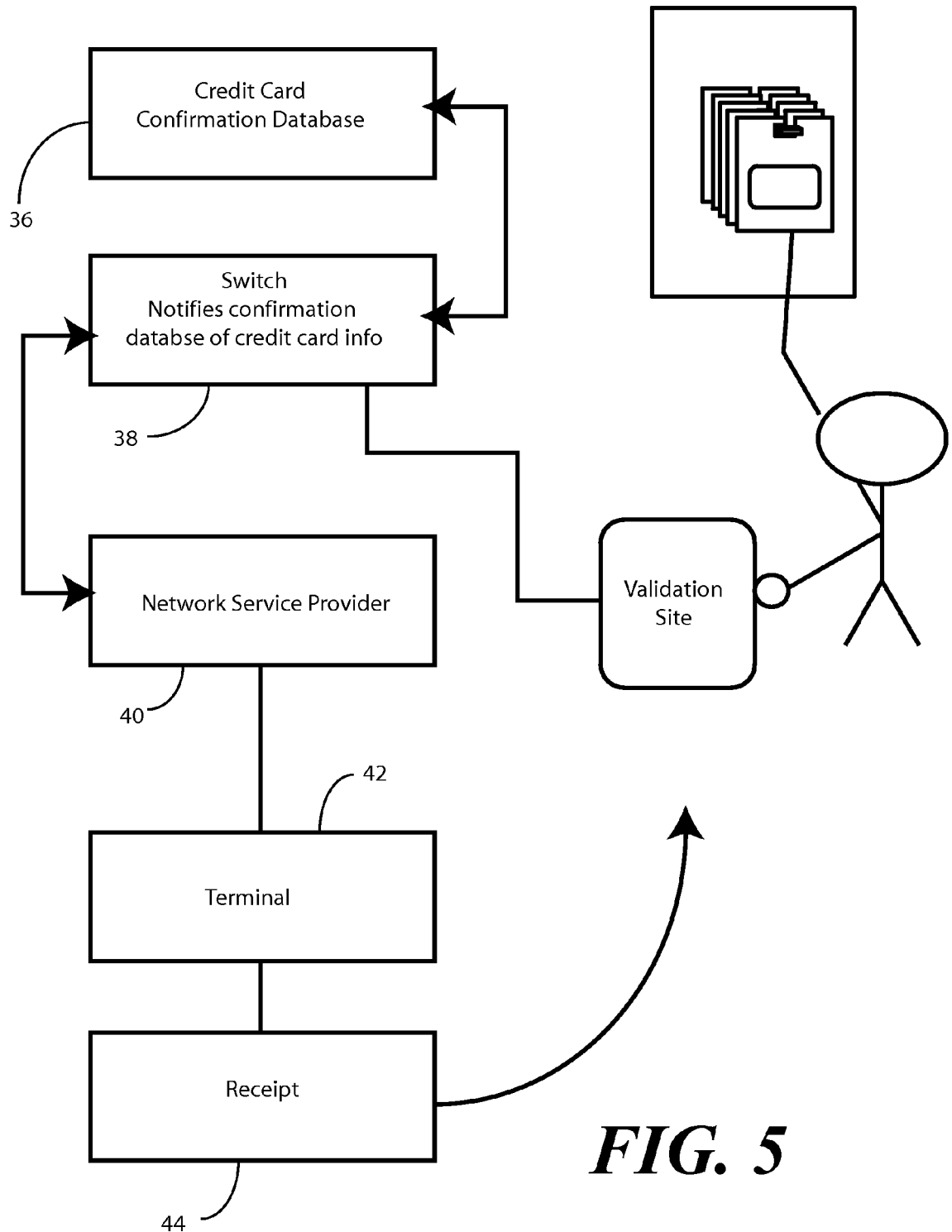
FIG. 5 illustrates a schematic representation of a credit card activation system in accordance with one embodiment of the invention, wherein the consumer may be provided a confirmation number for a credit card.

Turning now to FIG. 5, illustrated therein are components of one embodiment of the invention. These components include a confirmation database server 36 that may be accessed during the activation process. In one embodiment, the database server 36 is accessed through the use of a switch 38. Upon accessing the database server 36, the credit card number or other corresponding information of the selected credit card 24 may be checked to see whether the number is valid. Where it is not, the credit card 24 may be declined. Where the number is valid, the credit card 24 is approved and a credit card confirmation number is delivered, in conjunction with a network service provider 40 through a terminal 42. In one embodiment, the terminal 42 then prints the confirmation number on a receipt 44 for the consumer. The generation of a receipt 44 by terminal 42 is reported to network service provider 40 giving information such as the credit card number and transaction type.

It will be clear to those of ordinary skill in the art having the benefit of this disclosure, however, that after selecting a credit card 24, the consumer need not obtain a confirmation number at all. Certain retailers or credit issuers may desire such a confirmation number be issued for record keeping purposes. However, the present invention could equally be effected without the need of a consumer obtaining such confirmation number. For instance, the consumer may simply pick up the credit card 24 and then employ a mobile telephone or personal digital assistant to activate the card. Alternatively, in some circumstances, the consumer may take an non-activated card home to activate the card at a later time. Where the card is activated on-site, the consumer may obtain credit and make purchases in a single trip to the retail store.

Figure 2:
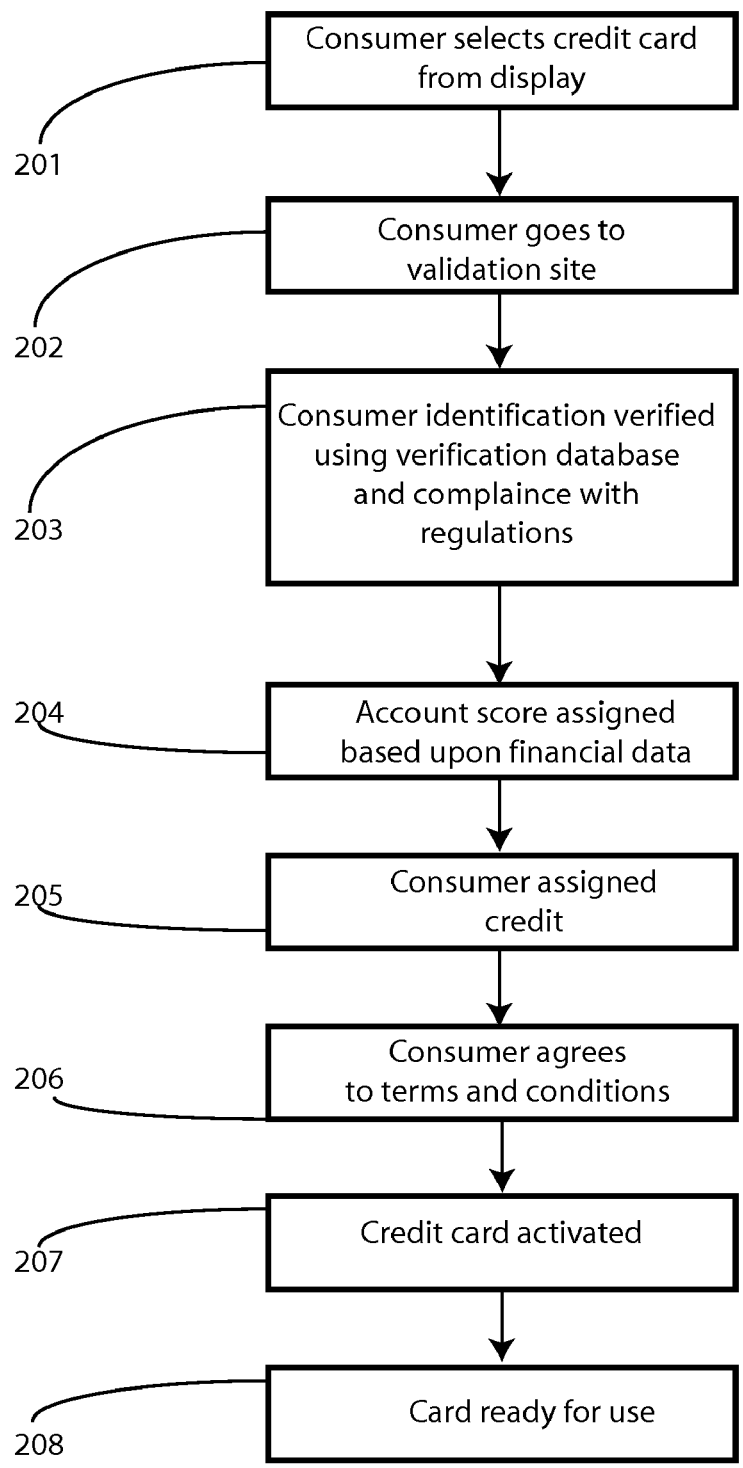
FIG. 2 illustrates a schematic representation of one embodiment of a credit card activation system in accordance with the invention.

Turning now to FIG. 2, illustrated therein is one method by which a consumer may obtain and activate a credit card in accordance with the invention. At step 201, the consumer selects a credit card from a display. This card may be one of a plurality of different cards, including cards with different terms and conditions, affiliations, and benefits.

Once the consumer has selected this credit card, the consumer then proceeds to an activation station at step 202. In one embodiment, the consumer may obtain activation of credit card through the activation station onsite by using the retailer's personnel or equipment, with or without use of a confirmation number.

Figure 6:
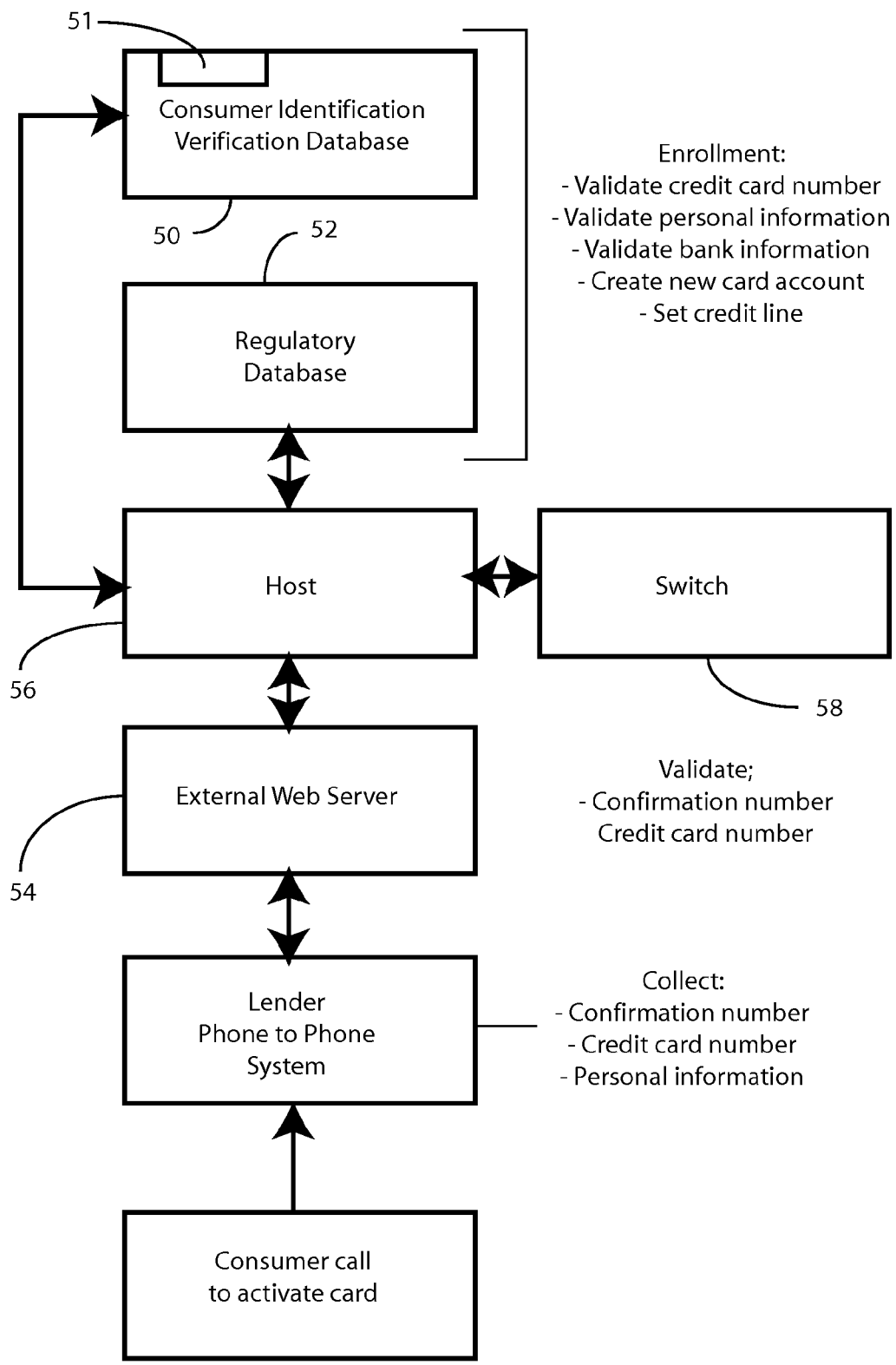
FIG. 6 illustrates a schematic representation of a credit card activation system in accordance with the invention, wherein a phone is used in order to activate the credit card.

The consumer then provides identification information to the activation station at step 203. This identification information may include name, address, driver's license number, birth date, or social security number to ensure that the lender knows to whom credit is being extended. Turning now to FIG. 6, in one embodiment, the consumer's identification may be verified using verification databases 50,52. These databases may be commercially available databases, such as those offered by credit reporting agencies. Alternatively, these databases 50,52 may be proprietary to the lender and may employ customized methods of verification. Further, the databases 50,52 may be provided by government or regulatory agencies. One commercial-based service suitable for use in verifying consumer identification in accordance with the invention is offered by ChoicePoint, of Alpharetta, Ga.

In one embodiment, the databases 50,52 are used to verify the consumer's identification. The consumer's identification may be verified by transmission of data relating to the consumer, such as the consumer's name, address, driver's license, birth date, or social security number. In addition to verifying identification, the databases 50,52 may also be used to ensure that issuance of credit to the consumer would be in compliance with various government and regulatory requirements, such as the Patriot Act and the requirements of the Office of Foreign Asset Control (OFAC) using appropriate Patriot Act and OFAC databases.

Turning back to FIG. 2, assuming the consumer's identification is verified at step 203, and presuming that the issuance of credit to the consumer is permissible under the governing statutes, laws, or regulations, the consumer's bank account data may be reviewed at step 204. In one embodiment, the consumer provides the credit card issuing company, or lender, with appropriate bank account information, such as bank identifier, bank account number, or other account identifying information. This information may alternatively be provided in conjunction with the consumer identification information.

During the review of bank account data at step 204, the lender may elect to assign an account score to the consumer's bank account, or accounts. This account score may be developed using an algorithm unique to the lender from factors developed from a review of data such as average account balance, automatic deposits, automatic drafts, insufficient fund charges, service charges for failure to maintain a minimum balance, stop payment orders, and so forth. Based on various formulas, calculations, or perhaps anecdotal evidence, the lender may then assign an account score to the consumer's account. In one embodiment, the consumer is assigned a line of credit based upon the account score. In another embodiment, the account score is one of several factors considered in the assignment of a line of credit.

Upon determining the account score, the lender may chose to approve or deny credit where the account score meets at least one predetermined criterion. For example, the account score may be based solely or in part on account activity. Where a person has a poor credit history, yet the person has an open and active financial account with deposits being regularly made, the lender may assign an account score that meets the criterion of periodic account activity. Where this is the case, the lender may choose to approve the credit based upon this account score.

In one embodiment, the account score is correlated to certain credit lines, credit limits or other terms and conditions. Where the consumer has an account score suitable for approval for credit, i.e. meeting at least one predetermined criterion, yet has an account score insufficient for a large credit limit, the lender may approve credit subject to certain terms and conditions, one example of which is that of annual percentage rate or other payment terms. While some prior art systems look only at credit scores, for example FICO scores, embodiments of the invention permit lenders to approve credit without the need of obtaining such scores, thereby shortening the approval process.

Once credit is established, terms and conditions of the credit card may be presented to the consumer at step 206. In one embodiment, the terms and conditions are a consumer specific set of terms and conditions based upon the account score, as different account scores may require different terms and conditions. By way of example, a lender may have a matrix of account scores and corresponding matrices of terms and conditions, which may include credit limit and annual percentage rate. A consumer with a lower account score may receive terms and conditions with a higher annual percentage rate or lower credit limit, or both. A higher account score may lead to opposite terms and conditions.

The consumer may then review the terms and conditions of the credit card. In one embodiment, the terms and conditions are structured so as to be in compliance with Truth in Lending laws and regulations, and other applicable laws and regulations. The consumer can then choose to agree to such terms through a handwritten signature, electronic signature, use of a PIN, or use of biometric information, such as a fingerprint, retina scan, hand vein map, or via other biometric sensing devices or personal information.

After the consumer has agreed to the terms and conditions applicable to credit card 24, the credit card is activated at step 207. From that point, the card is ready for use by the consumer in a manner typical of other credit cards as indicated by step 208.

Figure 3:
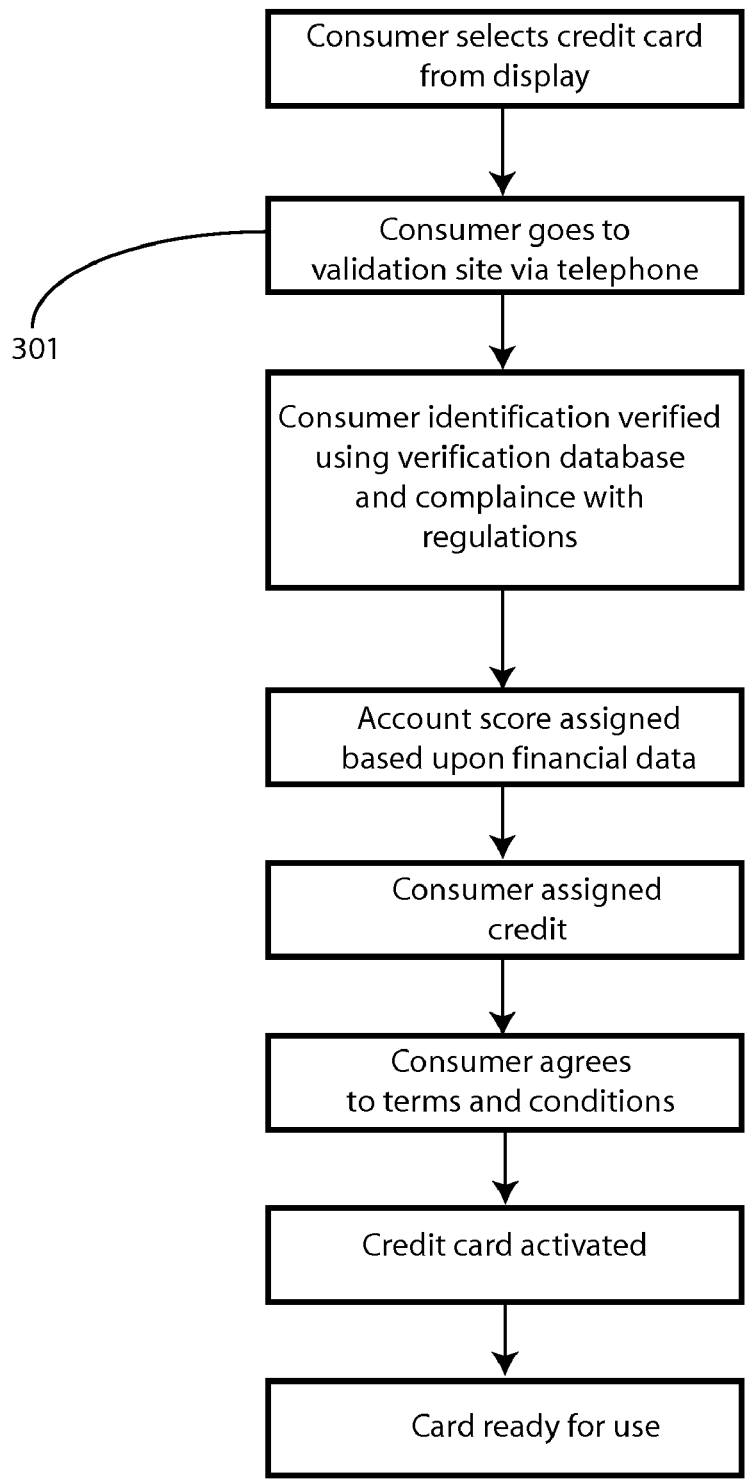
FIG. 3 illustrates a schematic representation of an alternate embodiment credit card activation system in accordance with the invention.

Turning now to FIG. 3, illustrated therein is an alternate embodiment of obtaining and activating a credit card in accordance with the invention. In the embodiment of FIG. 3, rather than the consumer providing the necessary information for activating onsite with the retailer after selection of a credit card 24 (as discussed above), the consumer simply leaves the retailer, and activates credit card 24 using a telephone at step 301. By dialing a telephone number provided by the issuer, such as a toll-free phone number, the consumer can provide the necessary personal information for identification, and also bank account information by phone through either interaction with live personnel, or through an interactive voice response system, or through use of a touch pad. The remaining steps for validation and activation of credit card 24 are similar to that discussed above with respect to FIG. 2.

Figure 4:
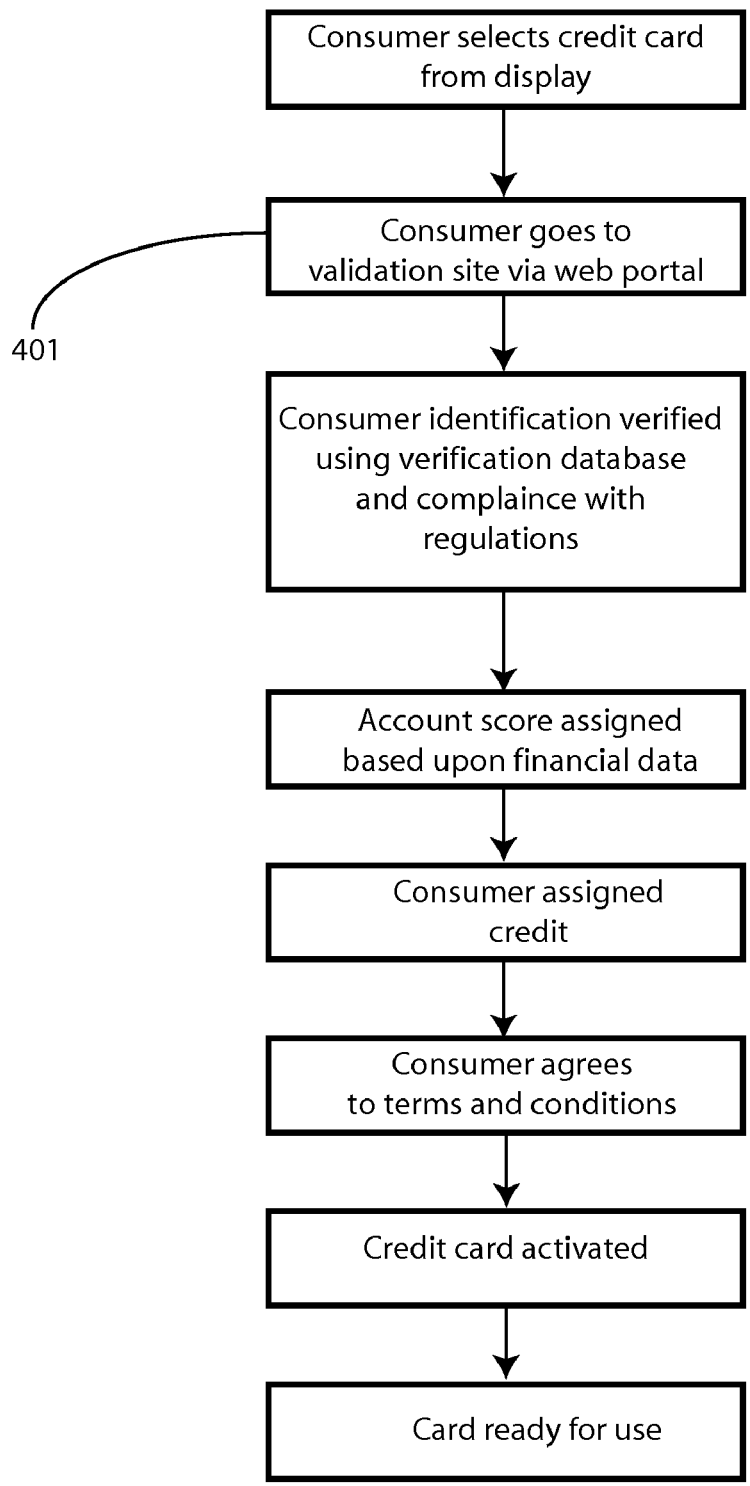
FIG. 4 illustrates a schematic representation of another alternate embodiment credit card activation system in accordance with the invention.

Turning now to FIG. 4, illustrated therein is an alternate embodiment of a method for obtaining and activating a credit card in accordance with the invention. In FIG. 4, in addition to or instead of the consumer providing the necessary information for activating onsite with the retailer or by phone, the consumer can provide the necessary personal information for identification, and also bank account information through an Internet connection to a validation website provided by the issuer or a third party designated by the issuer at step 401. Similarly, the consumer could provide such information to the issuer via email to a validation site email address or some other computer network other than the Internet. The remaining steps for validation and activation of credit card 24 are similar to that discussed above.

Turning now to FIG. 6, illustrated therein are components used for validation and enrollment of the consumer with respect to a credit card account. In FIG. 6, a consumer identification verification database 50, as well as Patriot Act and OFAC databases 52, are used for validating the credit card number selected by the consumer. The databases may also be used for validating the personal information provided by the consumer. Databases 50, 52 can be maintained on servers accessible via the Internet or other computer networks. Such validation may be not only from information provided by the consumer, but with ancillary information developed through researching the databases 50, 52 using the information provided by the consumer.

The databases 50,52 may also be used to validate the consumer's bank account, which may be any of a checking account, savings account, pass book account, brokerage account, or other account. Such validation may include obtaining information regarding how the consumer has handled bank accounts. For example, the databases 50,52 may include an account review module 51 configured to review bank account data such as number of transactions, amount of time the account has been open, average deposit amount, average balance, number of overdraft transactions or notices, number of electronic debits, number of liens on the account, and so forth, and to store it in the database 50. The account review 51 module may further be configured to generate a consumer specific set of terms and conditions based upon the account score Based on the financial account information, an algorithm or other evaluation criteria can be used to establish an account score usable by the issuer in determining whether to issue a credit card account to the consumer, and if so, what credit line should be issued to the consumer.

Where activation is performed by phone (301), the use of the databases 50,52 may be initiated by the consumer's phone call, or Internet access to a validation website, in order to activate credit card 24. Instead of calling a telephone number, the consumer can go to a website or use email to provide personal information for online or email validation of credit card 24. In such a procedure, the remaining steps performed for validation of the card would be similar to those discussed in regards to the methods of FIGS. 2 and 3.

Upon the consumer initiating accessing the validation site, the consumer may provide the confirmation number of credit card 24—where such confirmation number is given—as well as the credit card number and the consumer's personal information. This information is transmitted through use of an external web server 54 to host 56 which, using switch 58, validates the confirmation number provided by the consumer and also the credit card number. The remaining validation of credit card 24 takes place as discussed above.

Figure 7:
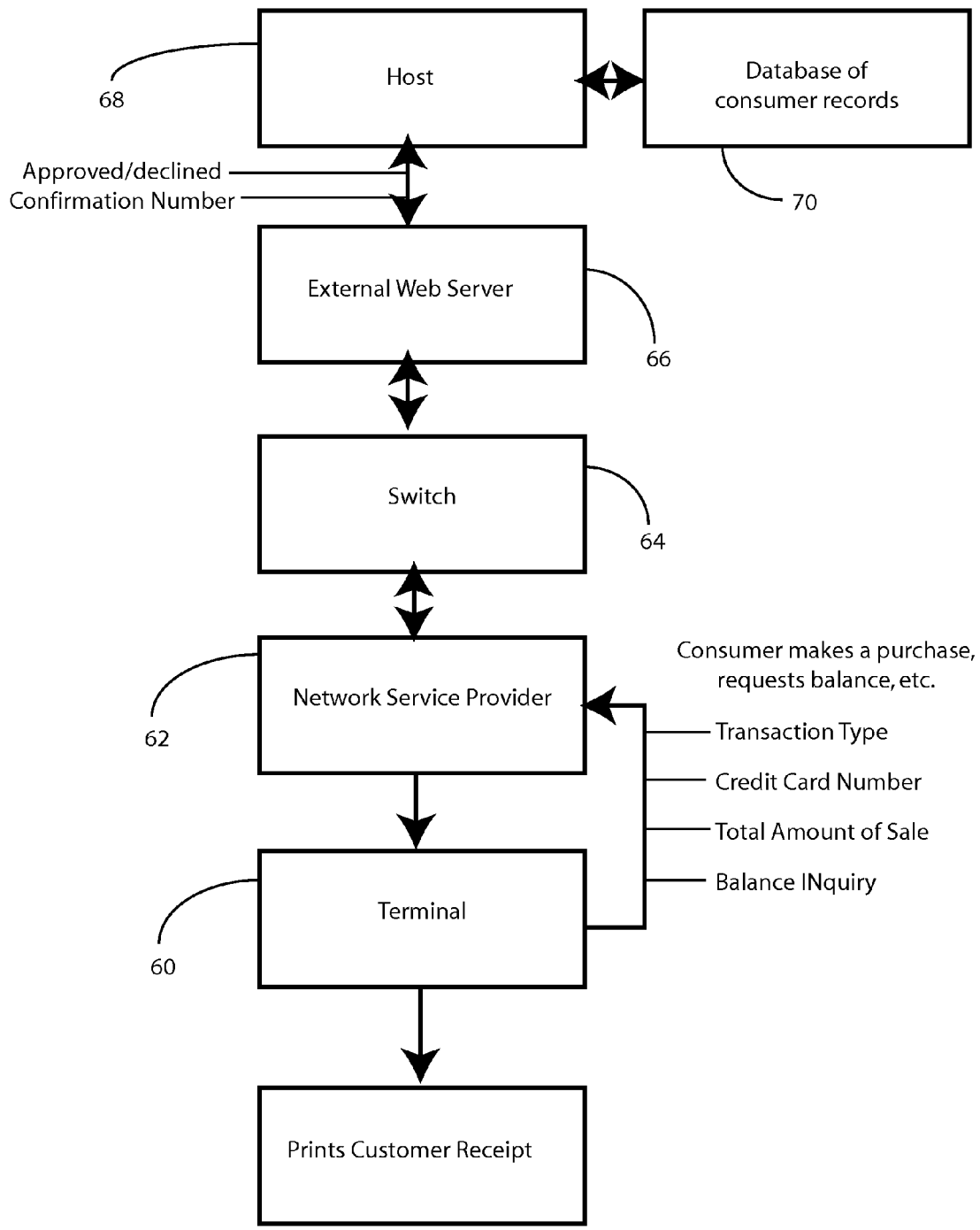
FIG. 7 illustrates a schematic representation of a credit card activation system in accordance with the invention, wherein the consumer uses the credit card to make a purchase, request an account balance, or otherwise access the credit card account.

Turning now to FIG. 7, illustrated therein are components used when the consumer makes a purchase or account inquiry with an activated credit card 24. For a purchase, a terminal 60 prints a receipt and communicates with a network service provider server 62, which in turn communicates with a switch 64. The switch 64 switches the purchase transaction to an external web server 66, which, acting through a host server 68 communicates with a database 70 of the consumer's records to confirm the consumer has an open and valid credit card account and available credit to cover the purchase. Based on this information obtained from database 70, the purchase transaction is approved or declined, and if approved, a confirmation number is generated by or on behalf of the lender. Terminal 60 is thus used to print a receipt for the consumer indication the purchase transaction was approved or declined. Other inquiries, such as account balance inquires, can be made in a similar manner using database 70.

A method of providing and activating a credit card to a consumer has been described and illustrated. In one embodiment, the method comprises the steps of providing a plurality of unactivated credit cards to the consumer, upon the consumer selecting one credit card from the plurality of unactivated credit cards, receiving an authorization request comprising consumer identification information and bank account information, verifying an identification of the consumer, verifying a bank account belonging to the consumer, determining a credit worthiness of the consumer, and delivering credit terms and conditions to the consumer. The method further comprises the steps of receiving a credit terms and conditions acceptance from the consumer and activating the one credit card.

In one embodiment, the step of receiving consumer identification comprises the step of receiving consumer information locally, for example at a validation site such as a cash register, check-out terminal, or kiosk. In an alternate embodiment, the step of receiving consumer information comprises the step of receiving the consumer information by telephone. In yet another embodiment, the step of receiving consumer information comprises the step of receiving the consumer information from a networked interface portal, such as a website.

Once information, such as personal identification information and credit card information, has been received, in one embodiment the consumer credit worthiness is then determined. An account score may be calculated to assist in determining credit worthiness. The score may be determined by determining a bank account history or a credit history.

Where the consumer is determined credit worthy, terms and conditions associated with the credit card are delivered. These terms and conditions may be accepted by the consumer. The acceptance is then received by one of receiving a signed document, receiving a personal identification number, or receiving a biometric indicator.

In addition to the method, a system for providing and activating a credit card for a consumer is also provided and described. In one embodiment, the system comprises a display comprising a plurality of credit cards offered for selection by a consumer and a validation site configured to receive consumer identification information and credit card information from a credit card selected from the display. The consumer selects a card from the display, and then provides identification information and credit card information to the validation site.

A switch in communication with the validation site is then configured to deliver the consumer identification information and credit card information through a network, such as the Internet or an intranet or other computer network. A consumer identification verification database in communication with the switch is then configured to validate the personal information, while a confirmation database server in communication with the switch is configured to validate credit card information. The validation station may be any of a checkout station, customer service desk, computer terminal, self-checkout stand, mobile telephone, kiosk, cash register, personal digital assistant, or credit card transaction device.

In one embodiment, to ensure that any offer of credit is in compliance with governmental and regulatory requirements, the switch is in communication with a regulatory database. Such requirements include the Patriot Act and regulations associated with the Office of Foreign Asset Control.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention.

What is claimed is:

1. A method of providing and activating a credit card to a consumer, the method comprising the steps of:
   a. providing a plurality of inactive credit cards to the consumer;
   b. upon the consumer selecting one credit card from the plurality of inactive credit cards, receiving an authorization request comprising consumer identification information and financial account information;
   c. verifying an identification of the consumer;
   d. verifying a financial account belonging to the consumer;
   e. determining a credit worthiness of the consumer; and
   f. delivering credit terms and conditions to the consumer.

2. The method of claim 1, further comprising the steps of receiving a credit terms and conditions acceptance from the consumer.

3. The method of claim 2, further comprising the step of activating the one credit card.

4. The method of claim 2, wherein the step of determining a credit worthiness of the consumer comprises determining an account score by reviewing data associated with the financial account, wherein the step of activating the one credit card occurs where the account score meets at least one predetermined criterion.

5. The method of claim 4, wherein the step of delivering terms and conditions to the consumer comprises determining a consumer specific set of terms and conditions based upon the account score.

6. The method of claim 2, wherein the step of receiving a credit terms and conditions acceptance from the consumer comprises one of receiving a signed document, receiving a personal identification number, or receiving a biometric indicator.

7. The method of claim 1, wherein the step of receiving the authorization request comprises the step of receiving the authorization request locally.

8. The method of claim 1, wherein the step of receiving the authorization request comprises the step of receiving the authorization request by telephone.

9. The method of claim 1, wherein the step of receiving the authorization request comprises the step of receiving the authorization request from a networked interface portal.

10. The method of claim 1, wherein the step of determining a credit worthiness of the consumer comprises determining an account score by reviewing data associated with the financial account.

11. The method of claim 10, wherein the data associated with the financial account is selected from the group consisting of average account balance, automatic deposits, automatic drafts, insufficient fund charges, service charges for failure to maintain a minimum balance, stop payment orders, and combinations thereof.

12. The method of claim 10, wherein the account score is determined by reviewing a financial account transaction history.

13. The method of claim 12, wherein the account score is further determined by reviewing a credit history.

14. The method of claim 1, wherein the plurality of inactive credit cards includes a plurality of credit card types.

15. A system for providing and activating a credit card for a consumer, the system comprising:
   a. a display comprising a plurality of credit cards offered for selection by a consumer;
   b. a validation site configured to receive consumer identification information and credit card information from a credit card selected from the display;
   c. a switch in communication with the validation site configured to deliver the consumer identification information and credit card information through a network;
   d. a consumer identification verification database in communication with the switch configured to validate the personal information;
   e. a confirmation database server in communication with the switch configured to validate credit card information.

16. The system of claim 15, wherein the validation site comprises one of a checkout station, customer service desk, computer terminal, self-checkout stand, mobile telephone, kiosk, cash register, personal digital assistant, or credit card transaction device.

17. The system of claim 15, wherein the switch is in communication with a regulatory database configured to ensure compliance with regulatory requirements.

18. The system of claim 15, wherein the regulatory requirements are selected from the group consisting of regulations associated with the Patriot Act and regulations associated with the Office of Foreign Asset Control.

19. The system of claim 15, wherein the confirmation database server is further configured to validate a bank account belonging to the consumer.

20. The system of claim 15, further comprising an account review module configured to review bank account data to establish an account score.

21. The system of claim 20, wherein the bank account data is selected from the group consisting of number of transactions, amount of time the account has been open, average deposit amount, average balance, number of overdraft transactions or notices, number of electronic debits, number of liens on the account, and combinations thereof.

22. The system of claim 21, wherein the account review module is further configured to generate a consumer specific set of terms and conditions based upon the account score.

23. The system of claim 15, wherein the validation site comprises a networked consumer portal configured to receive personal identification information by way of a validation website.

24. The system of claim 15, wherein the system further comprises a terminal in communication with the switch, wherein the terminal is configured to print a receipt.

25. The system of claim 24, wherein the receipt comprises terms and conditions associate with the credit card.

26. The method of claim 15, wherein at least some of the plurality of credit cards have terms and conditions different from at least some others of the plurality of credit cards.

* * * * *